United States Patent

Kim et al.

[11] Patent Number: 6,129,845
[45] Date of Patent: Oct. 10, 2000

[54] CATALYST-CONTAINING PHOTO-OXIDATION DEVICE, AND WATER TREATMENT SYSTEM OF A SEMICONDUCTOR DEVICE FABRICATION LINE EMPLOYING SAID DEVICE

[75] Inventors: Sue-ryeon Kim; Hyeon-jun Kim; Youn-chul Oh; Seung-un Kim, all of Kyungki-do, Rep. of Korea

[73] Assignee: Samsung Electronics Co., Ltd., Suwon, Rep. of Korea

[21] Appl. No.: 09/167,669

[22] Filed: Oct. 7, 1998

[30] Foreign Application Priority Data

Dec. 5, 1997 [KR] Rep. of Korea .................. 97-66290

[51] Int. Cl.[7] ........................... C02F 1/32; C02F 9/00
[52] U.S. Cl. .................. 210/663; 210/748; 210/763; 210/900; 210/195.2; 210/202; 422/186.3
[58] Field of Search ........................ 210/748, 663, 210/763, 805, 806, 900, 202, 205, 195.1, 195.2, 196; 422/186, 186.3; 250/436

[56] References Cited

U.S. PATENT DOCUMENTS

| | | | |
|---|---|---|---|
| 4,548,716 | 10/1985 | Boeve | 210/652 |
| 4,863,608 | 9/1989 | Kawai et al. | 210/638 |
| 5,470,461 | 11/1995 | Ban et al. | 210/202 |
| 5,547,823 | 8/1996 | Murasawa et al. | 210/763 |
| 5,622,622 | 4/1997 | Johnson | 210/205 |
| 5,683,589 | 11/1997 | De Lasa et al. | 210/748 |
| 5,779,912 | 7/1998 | Gonzalez-Martin et al. | 210/748 |

*Primary Examiner*—David A. Simmons
*Assistant Examiner*—Frank M. Lawrence
*Attorney, Agent, or Firm*—Jones Volentine, LLC

[57] ABSTRACT

A photo-oxidation device of a water treatment system photo-oxidizes organic material, in particular, aromatic organic material, in the water to facilitate its removal from the water. The photo-oxidation device includes a UV lamp, a flow channel in which the UV lamp is disposed, and a catalyst of an oxidation reaction between an organic material and the UV radiation emitted by the UV lamp. The UV radiation emitted from the UV lamp illuminates the flow channel while the water passes through the flow channel. The catalyst, on the other hand, is fixed to an inner wall of the flow channel to foster the oxidation of the organic material by the UV radiation. The water treatment system in which the photo-oxidation device is incorporated, includes a pre-treatment unit having particle filters, a first treatment section, and a second treatment section. The first treatment section has a reverse osmosis unit in which salts are removed from the water, a gas treatment unit in which gases are removed form the water, a first one of the photo-oxidation devices, and an ion-exchange unit in which ions are removed from the water. The second treatment section has a second photo-oxidation device, a second ion-exchange unit, and a particle-removing filter.

22 Claims, 4 Drawing Sheets

CATALYST-CONTAINING PHOTO-OXIDATION DEVICE, AND WATER TREATMENT SYSTEM OF A SEMICONDUCTOR DEVICE FABRICATION LINE EMPLOYING SAID DEVICE

BACKGROUND OF THE INVENTION

1. Field of the Invention

The present invention relates to a system for treating water used in the fabrication of semiconductor devices. More particularly, the present invention relates to a photo-oxidation device for oxidizing organic material contained in the water with UV (Ultra Violet) radiation, to a water treatment system equipped with the photo-oxidation device, and to a method of treating water comprising a step of irradiating the water with UV radiation to oxidize organic material contained in the water.

2. Description of the Related Art

Generally speaking, large amounts of water are used to clean semiconductor substrates and the like when fabricating semiconductor devices. The water is either municipal water or water which has already been used in the manufacturing line. Such water, however, must first be treated by a water treatment system.

The water used in the semiconductor device fabrication process is deionized water from which suspended particles, organic material, and ions, etc. have been completely removed. The deionized water is generally prepared by subjecting untreated water to a pre-treatment such as precipitation, followed by reverse osmotic pressure, photo-oxidation (using UV), and ion-exchange treatments.

The photo-oxidation treatment oxidizes the organic materials contained in the water. Specifically, a UV-lamp is used for irradiating the water with UV radiation of a certain wavelength. Then the water containing the oxidized organic materials is subjected to an ion-exchange treatment.

Referring to FIG. 1, the conventional photo-oxidation device comprises a UV-lamp 10 and a photo-oxidation section 12 including a line through which the water flows. The photo-oxidation is used to treat the micro-organic materials which were not removed by the other pre-treatments. When the water flowing through the photo-oxidation section is irradiated with UV radiation having a certain wavelength, these organic materials react with the UV radiation by oxidizing (photo-decomposition) into organic acid ions having a composition such as $CO_2$ or $HCO_3$. An ion-exchange treatment then uses $H^+$ or $OH^-$ to neutralize the organic acid ions.

However, aromatic organic materials, which are relatively stable chemical compounds, cannot be completely oxidized using the conventional photo-oxidation instrument. That is, UV radiation alone cannot cause aromatic organic materials to decompose into organic acid ions. Accordingly, water containing aromatic organic materials is supplied to the semiconductor device fabrication line. Because recent semiconductor fabrication processes are sensitive to organic materials on the order of ppb (Parts Per Billion) in the water, water containing aromatic organic materials may cause significant production failures. That is, the reliability and the yield of the semiconductor devices are adversely affected.

Furthermore, the water-treatment system operates continuously in an attempt to treat the water as completely as possible. This contributes to increased manufacturing costs.

SUMMARY OF THE INVENTION

An object of the present invention is directed to provide a photo-oxidation device, a water treatment system equipped with the photo-oxidation device, and a method of treating water, which substantially overcomes one or more of the problems, disadvantages and limitations of the related art.

More specifically, one object of the present invention is to remove all organic material, even aromatic organic material, from water before the water is used in the semiconductor device fabrication line, to thereby prevent the water from being a factor in limiting the yield of quality semiconductor devices which can be produced by the line.

To achieve this object, the present invention provides a photo-oxidation device comprising a UV lamp, a photo-oxidation section having an inlet, an outlet and a flow channel in which the UV lamp is disposed, and a catalyst of an oxidation reaction between an organic material and the UV radiation emitted by the UV lamp. The UV radiation emitted from the UV lamp illuminates the flow channel while the water passes through the flow channel. The catalyst, on the other hand, is fixed to an inner wall of the flow channel to foster the oxidation of the organic material by the UV radiation. The UV lamp preferably emits UV light having a wavelength of just 185 nm or UV light of two wavelengths, 185 nm and 254 nm. Furthermore, the catalyst is preferably made of $TiO_2$. The surface of the catalyst which faces away from the inner wall of the flow channel is coated with a polymer film.

Also, the object of the present invention is achieved by a water treatment system comprising a pre-treatment unit, a first treatment section having a first one of the photo-oxidation devices, and a second treatment section having a second one of the photo-oxidation devices.

The pre-treatment unit includes at least one particle filter, e.g. a sand filter, for filtering relatively large particles (those in suspension) from the water. The first treatment section also includes a reverse osmosis unit in which salts are removed from the water, a gas treatment unit in which gas, such as $O_2$ or $CO_2$ is removed from the water by a vacuum filter before the water passes to the first photo-oxidation device, and an ion-exchange unit in which ions are removed from the water by interaction with an ion-exchange resin after the organic material has been oxidized in the first photo-oxidation device. The second treatment section has a second ion-exchange unit in which ions are removed from the water after organic material has been oxidized in the second photo-oxidation device, and a particle-removing filter.

Preferably, the system also has a first water storage tank between the reverse osmosis unit and the gas treatment unit, and a second water storage tank between the first ion-exchange unit and the second photo-oxidation device.

The UV lamp of the first photo-oxidation preferably emits UV light having wavelengths of both 185 nm and 254 nm, whereas the UV lamp of the second photo-oxidation device emits UV light having a wavelength of only 185 nm.

By using a water treatment system of this type, one can remove essentially all organic material and ions from the water in accordance with the main object of the present invention.

The water is pre-treated by filtering to remove particles in suspension in the water, thereby improving the clarity of the water.

Next, the water is first treated by subjecting the water to reverse osmotic pressure to remove organic materials and ions from the received water, then subjecting the water to a vacuum to remove gases from the water, then irradiating the water with UV light while exposing the water to a catalyst of $TiO_2$ to photo-oxidize organic material in the water, and then exposing the water to an ion-exchange resin to neutralize ions in the water.

Subsequently the water is treated for a second time by again irradiating the water with UV light while exposing the water to a catalyst of $TiO_2$ to photo-oxidize organic material remaining in the water, then again exposing the water to an ion-exchange resin to neutralize ions in the water, and then filtering the water to remove particles from the water.

BRIEF DESCRIPTION OF THE DRAWINGS

These and other objects, features and advantages of the present invention will become more apparent from the following detailed description of preferred embodiments thereof made with reference to the accompanying drawings, of which.

DETAILED DESCRIPTION OF THE PREFERRED EMBODIMENTS

Figure 1:
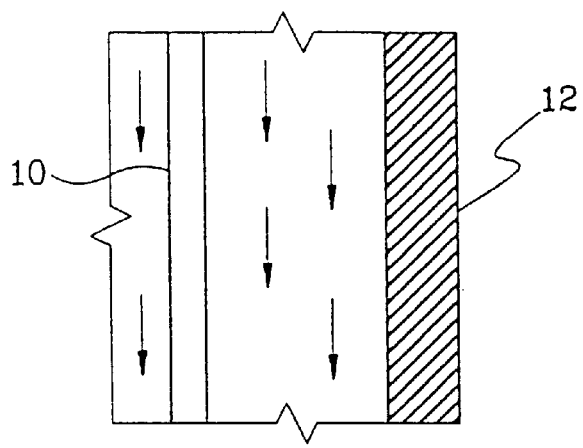
FIG. 1 is a sectional view of part of a conventional photo-oxidation device of a water treatment system of a semiconductor device fabrication line.
Figure 2:
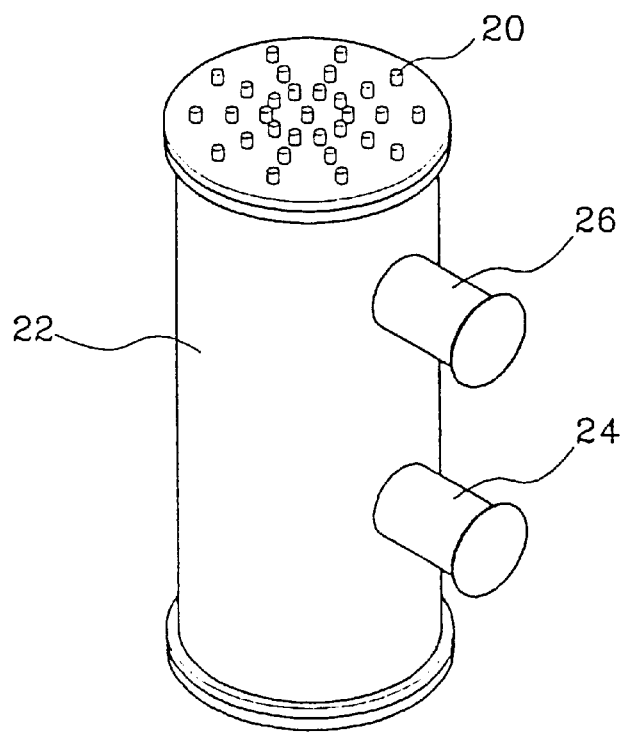
FIG. 2 is a perspective view of one embodiment of a photo-oxidation device of a water treatment system according to the present invention.
Figure 3:
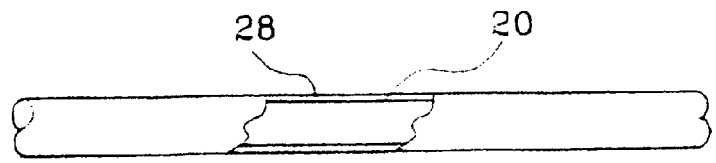
FIG. 3 is a partially cut-away view of a UV-lamp of the photo-oxidation device.

First, referring to FIG. 2, the photo-oxidation device includes a UV lamp 20 for emitting UV light of a certain wavelength, a photo-oxidation section 22 having a flow channel containing the UV lamp 20, and an inlet 24 and an outlet 26 open to the flow channel. As shown in FIG. 3, the UV-lamp has an outer coating of quartz 28. The UV lamp 20 can emit UV light having a wavelength of 185 nm or 254 nm. In addition, the UV lamp 20 may comprise a plurality of bulbs extending through the photo-oxidation section 22.

Figure 4:
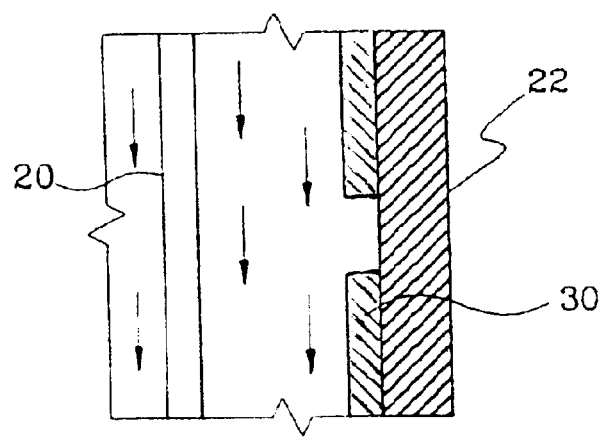
FIG. 4 and FIG. 5 each illustrate one part of the photo-oxidation device according to the present invention.
Figure 5:
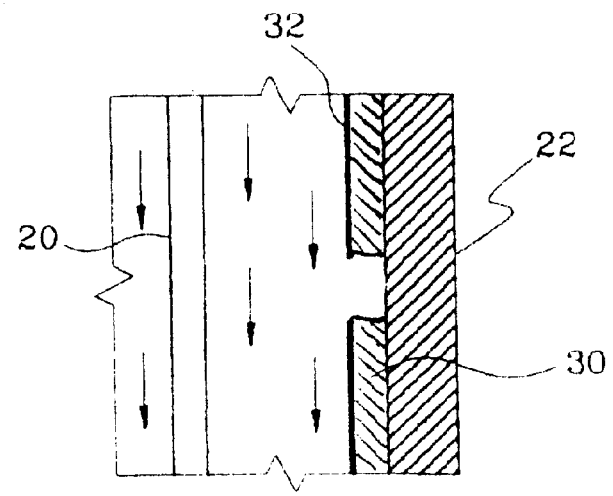

As shown in FIGS. 4 and 5, the flow channel of the photo-oxidation section 22 of the present invention has a catalyst 30 extending along and fixed to the inner wall thereof. The catalyst 30 is made of $TiO_2$. Aromatic organic materials, present in the water as relatively stable chemical compounds, can be oxidized by the UV irradiation when under the influence of the $TiO_2$ of the catalyst 30. That is, organic materials at the surface of the catalyst 30 of $TiO_2$ will almost certainly be oxidized when irradiated with the UV light. It should also be noted that although the catalyst 30 can be contiguous throughout the entire length of the flow channel of the photo-oxidation section 22, the catalyst 30 can alternatively comprise a plurality of discrete segments spaced apart from each other in the direction of flow of the water as shown in the figures.

Next, as shown in FIG. 5, the catalyst 30 has a polymer film 32 coating the $TiO_2$. The polymer film 32 is provided to prevent the water from being contaminated by the $TiO_2$ as the water rushes thereover. Again, recent semiconductor device fabrication processes are very sensitive to even the smallest amounts of contaminants. Therefore, the polymer film 32 is necessary to prevent the water from abrading the $TiO_2$ and entraining the particles which would be produced by such action.

Figure 6:
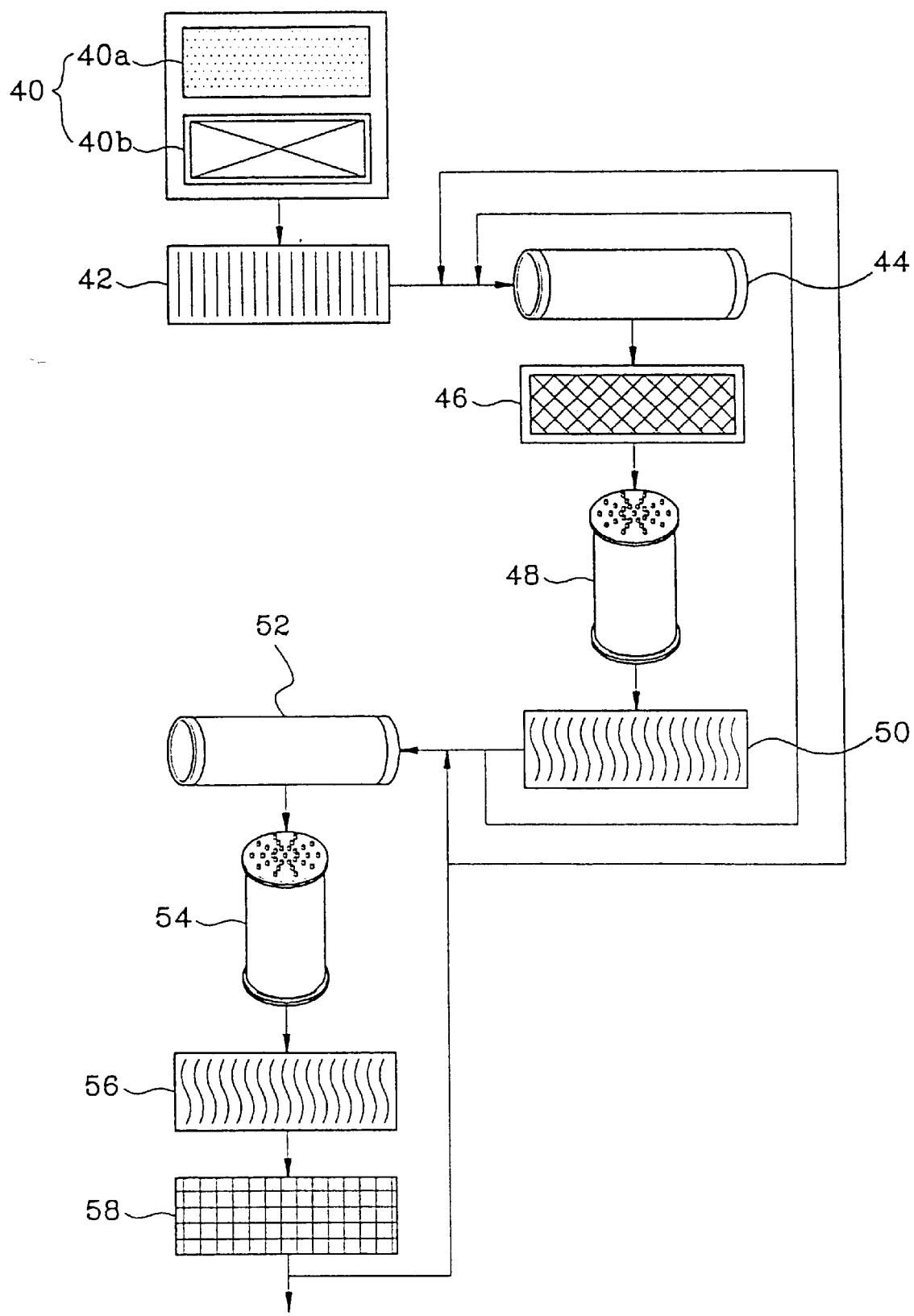
FIG. 6 is a schematic diagram of one embodiment of a water treatment system of a semiconductor device fabrication line according to the present invention.

A water treatment system equipped with the photo-oxidation device according to the present invention is illustrated in FIG. 6. The initial portion of the water treatment system comprises a pre-treatment unit 40 having a sand filter 40a through which the water initially passes, whereby large particles suspended in the water are filtered out. The pre-treatment unit 40 also includes an activated carbon filter 40b. Thus, particles suspended in the water are removed to thereby improve the clarity of the water. The pretreatment of the water in this way serves to prevent the downstream devices of the water treatment system from being overloaded.

A reverse osmosis device 42 is disposed downstream of the pretreatment unit 40. The reverse osmosis device 42 comprises a filter designed to produce reverse osmotic pressure for the purpose of removing ions and organic materials from the water. More specifically, certain organic materials and ions are removed from the water by reverse osmosis. In reverse osmosis, salts, such as NaCl, in solution are separated from the water by a semi-permeable membrane. The salts in the water pass through the membrane to an area of lower salt concentration.

A first temporary storage tank 44 is connected to the reverse osmosis device 42 for temporarily storing the water passing through the device.

The temporary storage tank 44 is connected to a gas treatment unit 46 having a vacuum filter for producing a vacuum to remove gas, such as $O_2$ or $CO_2$, from the water. Moreover, the piping of the water treatment system can be configured, as shown by the arrows in FIG. 6, so that the first temporary storage tank 44 receives water from not only the reverse osmosis unit 42, but also water which had been used in the semiconductor device fabrication process. Therefore, this water is recycled, i.e. is used again by being re-treated according to the following measures.

According to the present invention, the organic materials in the water are oxidized by UV radiation after the above-mentioned gases have been removed therefrom. That is, the organic materials are oxidized by a first photo-oxidation unit 48 comprising an UV lamp 20, and a photo-oxidation section 22 containing a plurality of bulbs of the UV lamp 20 and a catalyst 30 made of $TiO_2$. The UV lamp 20 of the first photo-oxidation unit 48 emits UV light having a wavelength (s) of 185 nm or rays of light having wavelengths of both 185 nm and 254 nm.

From there, the water passes to a first ion-exchange unit 50 having an ion-exchange resin which in effect removes the oxidized organic materials using $H^+$ or $OH^-$.

A second temporary storage tank 52 temporarily stores the water that has passed through the first ion-exchange unit 50.

Organic materials still remaining in the water are oxidized by UV radiation. That is, a second photo-oxidation unit 54 is disposed downstream of the first ion-exchange unit 50 and temporary tank 52. The second photo-oxidation unit 54 also comprises a UV lamp 20, and a photo-oxidation section 22 containing a plurality of bulbs of the UV lamp 20 and a catalyst 30 made of $TiO_2$. The UV lamp 20 of the second photo-oxidation unit 54 of the present invention can emit UV light having a wavelength of 185 nm.

A second ion-exchange unit 56 comprising an ion-exchange resin receives the water from the second photo-oxidation unit 54, and uses $H^+$ or $OH^-$ to in effect remove the organic materials oxidized by the second photo-oxidation unit 54.

Finally, a particle treatment unit 58 comprising a filter is provided downstream of the second ion-exchange unit 54 for filtering out any particles remaining in the water.

Figure 7:
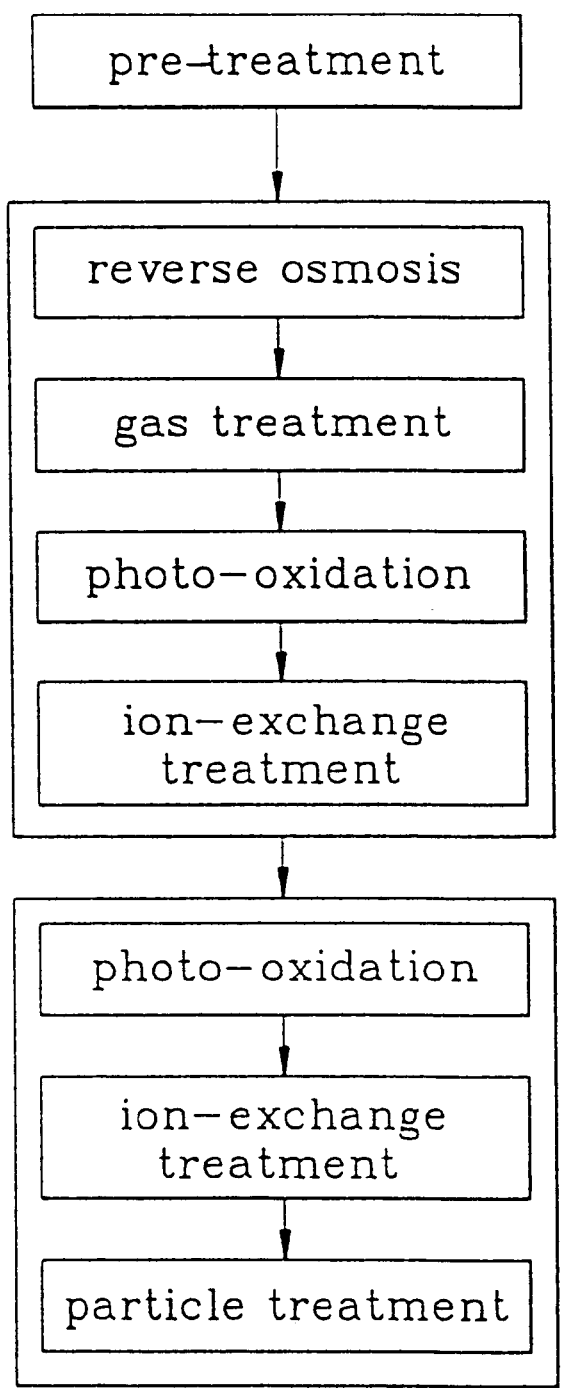
FIG. 7 is a block diagram of one embodiment of a method of treating water in the fabricating of semiconductor devices according to the present invention.

A method of treating water according to the present invention is illustrated in FIG. 7. The method can be broken down into a pretreatment stage, first treatment stage involving reverse osmosis, photo-oxidation, and ion-exchange, and a second treatment stage involving photo-oxidation, ion-exchange, and particle treatment.

According to the present invention, the photo-oxidation treatment using a catalyst of $TiO_2$ oxidizes the aromatic organic materials so that the water is suitable for modern fabrication processes in which the particles in the water must be limited to only several ppb.

In addition, the productivity and the reliability of the semiconductor devices are improved by the water-treatment system of the present invention because the system completely removes organic materials from the water before the water is used in the fabricating of the semiconductor devices.

Although the present invention has been described in detail, various changes, substitutions and alterations thereto will become apparent to those of ordinary skill in the art. All such changes, substitutions and alterations are seen to be within the true spirit and scope of the invention as defined by the appended claims.

What is claimed is:

1. A water treatment method in the semiconductor device fabrication process comprising the steps of:
   a) pre-treating the water for improving the precipitation of the floating materials contained in the water to be used in the fabrication process, and the muddiness of the water;
   b) carrying out a first water-treatment comprising reverse osmosis treatment for removing the organic materials and ions contained in the received water from the pre-treatment, gas treatment for removing the gas such as $O_2$ or $CO_2$, etc., photo-oxidation treatment for irradiating a certain wavelength of UV to the water by using a catalyst of $TiO_2$, and ion-exchange treatment by ion exchange, the above treatment steps being carried out in sequence such that the water passing through the pre-treatment is received and the organic materials or ions in the water are treated;
   c) carrying out a second water-treatment comprising photo-oxidation treatment for irradiating a certain wavelength of UV to the water by using a catalyst of $TiO_2$, ion-exchange treatment using ion-exchange, particle treatment for removing particles the above steps being carried out in sequence such that the water passing through the first water treatment is received and the organic materials or ions in the water are treated; and
   d) temporarily storing the water having had the organic material and ions removed therefrom by reverse osmotic pressure in a temporary storage tank prior to the exposing of the water to the UV light of at least one predetermined wavelength.

2. The method of treating water of claim 1, wherein said step of first treating the water comprises exposing the water to UV light having at least one wavelength selected from a group consisting of 185 nm and 254 nm wavelengths.

3. The method of treating water of claim 1, wherein said step of treating the water for a second time comprises exposing the water to UV light having a wavelength of 185 nm.

4. The method of treating water of claim 1, and further comprising a step of recirculating water, having undergone said steps of pre-treating, first treating and second treating, to the temporary storage tank.

5. A water treatment method in the semiconductor device fabrication process comprising the steps of:
   a) pre-treating the water for improving the precipitation of the floating materials contained in the water to be used in the fabrication process, and the muddiness of the water;
   b) carrying out a first water-treatment comprising reverse osmosis treatment for removing the organic materials and ions contained in the received water from the pre-treatment, gas treatment for removing the gas such as $O_2$ or $CO_2$, etc., photo-oxidation treatment for irradiating a certain wavelength of UV to the water by using a catalyst of $TiO_2$, and ion-exchange treatment by ion exchange, the above treatment steps being carried out in sequence such that the water passing through the pre-treatment is received and the organic materials or ions in the water are treated;
   c) carrying out a second water-treatment comprising photo-oxidation treatment for irradiating a certain wavelength of UV to the water by using a catalyst of $TiO_2$, ion-exchange treatment using ion-exchange, particle treatment for removing particles the above steps being carried out in sequence such that the water passing through the first water treatment is received and the organic materials or ions in the water are treated; and
   d) temporarily storing the water in a temporary storage tank after said step of first treating the water and prior to said step of treating the water for a second time.

6. The method of treating water of claim 5, and further comprising a step of recirculating water, having undergone said steps of pre-treating, first treating and second treating, to the temporary storage tank.

7. A photo-oxidation device for treating water, said device comprising:
   a UV lamp emitting ultra-violet radiation of at least one predetermined wavelength;
   a photo-oxidation section in which the UV lamp is disposed, said photo-oxidation section comprising a flow channel constituted by a casing having a tubular inner wall surface, and an inlet and an outlet spaced from one another in the axial direction of the tubular inner wall surface and open to said flow channel, the ultra-violet radiation emitted from said UV lamp illuminating the flow channel whereby water passing through the flow channel via the inlet and outlet is irradiated with the ultra-violet radiation; and
   a catalyst of an oxidation reaction between an organic material and ultra-violet radiation of said predetermined wavelength, said catalyst comprising a plurality of discrete segments spaced apart from one another along the tubular inner wall surface of said casing as taken in the axial direction in which the inlet and the outlet are spaced from one another, each of the segments of said catalyst being disposed on and fixed to the tubular inner wall surface of the casing of said photo-oxidation section, and each of the segments of said catalyst having a first side surface lying against said tubular inner wall surface and an opposite second side surface facing inwardly with respect to said flow channel so as to foster the oxidation of the organic material when the organic material is contained in water flowing through the channel and irradiated by the ultra-violet radiation.

8. The photo-oxidation device of claim 7, wherein said UV lamp emits ultra-violet radiation having a wavelength of 185 nm.

9. The photo-oxidation device of claim 7, wherein said UV lamp emits ultra-violet radiation having a wavelength of 254 nm.

10. The photo-oxidation device of claim 7, wherein said UV lamp comprises a plurality of individual bulbs.

11. The photo-oxidation device of claim 7, wherein said catalyst is of $TiO_2$.

12. The photo-oxidation device of claim 7, and further comprising a polymer film coating the segments of said catalyst at sides thereof exposed to said flow channel.

13. A photo-oxidation device for treating water, said device comprising:

a UV lamp emitting ultra-violet radiation of at least one predetermined wavelength;

a photo-oxidation section in which the UV lamp is disposed, said photo-oxidation section comprising a flow channel constituted by a casing having a tubular inner wall surface, and an inlet and an outlet spaced from one another in the axial direction of the tubular inner wall surface and open to said flow channel, the ultra-violet radiation emitted from said UV lamp illuminating the flow channel whereby water passing through the flow channel via the inlet and outlet is irradiated with the ultra-violet radiation;

a catalyst of an oxidation reaction between an organic material and ultra-violet radiation of said predetermined wavelength, said catalyst being fixed to said casing of said photo-oxidation section in said flow channel, of said catalyst having a side surface facing said flow channel so as to foster the oxidation of the organic material when the organic material is contained in water flowing through the channel and irradiated by the ultra-violet radiation; and a protective polymer film coating the side surface of said catalyst which faces said flow channel, said polymer film being exposed to the interior of said flow channel, whereby that water flowing through the channel passes over and along the film so as to prevent particles of said catalyst from being entrained by the flowing water;

wherein said catalyst comprises a plurality of discrete segments spaced apart from one another along the inner wall surface of said flow channel as taken in said axial direction.

14. The photo-oxidation device of claim 13, wherein said UV lamp emits ultra-violet radiation having a wavelength of 185 nm.

15. The photo-oxidation device of claim 13, wherein said UV lamp emits ultra-violet radiation having a wavelength of 254 nm.

16. The photo-oxidation device of claim 13, wherein said UV lamp comprises a plurality of individual bulbs.

17. The photo-oxidation device of claim 13, wherein said catalyst is of $TiO_2$.

18. A water treatment system comprising:

a pre-treatment unit comprising a filter of sand;

a reverse osmosis unit connected to and disposed downstream of said pre-treatment unit with respect to a direction of flow of water through the water treatment system so as to receive filtered water from said pre-treatment unit, said reverse osmosis unit comprising a semi-permeable membrane which filters the water using reverse osmotic pressure;

a gas treatment unit connected to and disposed downstream of said reverse osmosis unit with respect to the direction of flow of the water, said gas treatment unit comprising a vacuum filter which generates a vacuum to remove pockets of gas from the water;

a first photo-oxidation unit disposed downstream of said gas filter unit with respect to said direction of flow of the water, said first photo-oxidation unit comprising a UV lamp having a plurality of bulbs emitting ultra-violet radiation of at least one predetermined wavelength, a photo-oxidation section in which the UV lamp is disposed, said photo-oxidation section comprising a flow channel, an inlet connected to said gas filter unit and opening into said flow channel, and an outlet open to said flow channel, the ultra-violet radiation emitted from said UV lamp illuminating the flow channel whereby water passing through the flow channel is irradiated with the ultra-violet radiation, and a catalyst of an oxidation reaction between an organic material and ultra-violet radiation of said predetermined wavelength, said catalyst comprising $TiO_2$ and being fixed to an inner wall of said flow channel to foster the oxidation of the organic material when the organic material is contained in water flowing through the channel and irradiated by the ultra-violet radiation;

a first ion-exchange unit connected to the outlet of the photo-oxidation section of said first photo-oxidation unit so as to receive therefrom water having oxidized organic material, said first ion-exchange unit comprising a resin which facilitates an ion-exchange with water passing through the ion-exchange unit so as to neutralize ions in the water;

a second photo-oxidation unit disposed downstream of said first ion-exchange unit with respect to said direction of flow of the water, said second photo-oxidation unit comprising a second UV lamp having a plurality of bulbs emitting ultra-violet radiation of a predetermined wavelength, a second photo-oxidation section in which the second UV lamp is disposed, said second photo-oxidation section comprising a second flow channel, an inlet connected to said first ion-exchange unit and opening into said second flow channel, and an outlet open to said second flow channel, the ultra-violet radiation emitted from said second UV lamp illuminating the second flow channel whereby water passing through the second flow channel is irradiated with the ultra-violet radiation, and a second catalyst of an oxidation reaction between an organic material and the ultra-violet radiation emitted by said second UV lamp, said second catalyst comprising $TiO_2$ and being fixed to an inner wall of said second flow channel to foster the oxidation of the organic material when the organic material is contained in water flowing through the second flow channel and irradiated by the ultra-violet radiation;

a second ion-exchange unit connected to the outlet of the photo-oxidation section of said second photo-oxidation unit so as to receive therefrom water having oxidized organic material, said second ion-exchange unit comprising a resin which facilitates an ion-exchange with water passing through the second ion-exchange unit so as to neutralize ions in the water; and a particle treatment unit connected to and disposed downstream of said second photo-oxidation unit, said particle treatment unit comprising a filter.

19. The water treatment system of claim 18, wherein said pre-treatment unit further comprises a filter of activated carbon.

20. The water treatment system of claim 18, and further comprising a first temporary storage tank inter-connected between said reverse osmosis unit and said gas treatment unit, and a second temporary storage tank interconnected between said first ion-exchange unit and said second photo-oxidation unit.

21. The water treatment system of claim 18, wherein the UV lamp of said first photo-oxidation unit emits UV light having at least one wavelength selected from a group consisting of 185 nm and 254 nm wavelengths.

22. The water treatment system of claim 18, wherein the UV lamp of said second photo-oxidation unit emits UV light having a wavelength of 185 nm.

* * * * *